(12) United States Patent
Kim

(10) Patent No.: US 12,118,799 B2
(45) Date of Patent: Oct. 15, 2024

(54) METHOD OF SELECTING ACCIDENT IMAGE USING RESULTS OF RECOGNITION OF OBSTACLE ON ROAD

(71) Applicant: AIMATICS CO., LTD., Seoul (KR)

(72) Inventor: Jin Hyuck Kim, Seoul (KR)

(73) Assignee: AIMATICS CO., LTD., Seoul (KR)

( * ) Notice: Subject to any disclaimer, the term of this patent is extended or adjusted under 35 U.S.C. 154(b) by 422 days.

(21) Appl. No.: 17/636,677

(22) PCT Filed: Dec. 29, 2021

(86) PCT No.: PCT/KR2021/020134
§ 371 (c)(1),
(2) Date: Feb. 18, 2022

(87) PCT Pub. No.: WO2022/146017
PCT Pub. Date: Jul. 7, 2022

(65) Prior Publication Data
US 2023/0222810 A1 Jul. 13, 2023

(30) Foreign Application Priority Data
Dec. 31, 2020 (KR) .......... 10-2020-0189435

(51) Int. Cl.
*G06V 20/58* (2022.01)
*G06T 7/20* (2017.01)
(Continued)

(52) U.S. Cl.
CPC .............. *G06V 20/58* (2022.01); *G06T 7/20* (2013.01); *G06T 7/50* (2017.01); *G06V 10/25* (2022.01);
(Continued)

(58) Field of Classification Search
CPC ........ G06V 20/58; G06V 10/25; G06V 10/82; G06V 10/764; G06T 7/20; G06T 7/50;
(Continued)

(56) References Cited

U.S. PATENT DOCUMENTS

2019/0025067 A1* 1/2019 Barecke ............ G01C 21/3415
2021/0016710 A1* 1/2021 Eo ........................... B60R 1/002

FOREIGN PATENT DOCUMENTS

KR    1020130101821 A    9/2013

OTHER PUBLICATIONS

Computer English Translation of Korean Patent No. KR2020-0023692 A, pp. 1-14. (Year: 2020).*
(Continued)

*Primary Examiner* — Daniel G Mariam
(74) *Attorney, Agent, or Firm* — You & IP, LLC

(57) ABSTRACT

The present disclosure relates to a method of selecting an accident image using the results of the recognition of an obstacle on a road, which can distinguish between an actual accident image and a fake accident image by previously recognizing an obstacle on a road while a vehicle travels and determining an impact event to have a low accident possibility, the impact event occurring in a section in which the vehicle goes over the obstacle, or suppressing the impact event, and can secure a space of a storage medium by deleting the fake accident image or prevent a data usage fee and unnecessary management expenses by blocking the transmission of the fake accident image to a remote cloud server.

10 Claims, 6 Drawing Sheets

(51) Int. Cl.
- *G06T 7/50* (2017.01)
- *G06V 10/25* (2022.01)
- *G06V 10/764* (2022.01)
- *G06V 10/82* (2022.01)
- *G07C 5/00* (2006.01)

(52) U.S. Cl.
CPC ............ *G06V 10/764* (2022.01); *G06V 10/82* (2022.01); *G07C 5/008* (2013.01); *G06T 2207/20084* (2013.01); *G06T 2207/30261* (2013.01)

(58) Field of Classification Search
CPC ........... G06T 2207/20084; G06T 2207/30261; G07C 5/008
See application file for complete search history.

(56) References Cited

OTHER PUBLICATIONS

Computer English Translation of Korean Patent No. KR-10-1620862 B1, pp. 1-17. (Year: 2016).*

Computer English Translation of Korean Patent No. KR 10-1729482 B1, pp. 1-10. (Year: 2017).*

* cited by examiner (a) T0

$T1 = D/v - \Delta T_{start}$ (b) T1

$T2 = (D+d)/v + \Delta T_{end}$ (c) T2

METHOD OF SELECTING ACCIDENT IMAGE USING RESULTS OF RECOGNITION OF OBSTACLE ON ROAD

TECHNICAL FIELD

The present disclosure relates to a method of selecting an accident image using the results of the recognition of an obstacle on a road, which can distinguish between an actual accident image and a fake accident image by previously recognizing an obstacle on a road while a vehicle travels and determining an impact event to have a low accident possibility, the impact event occurring in a section in which the vehicle goes over the obstacle, or suppressing the impact event, and can secure a space of a storage medium by deleting the fake accident image or prevent a data usage fee and unnecessary management expenses by blocking the transmission of the fake accident image to a remote cloud server.

BACKGROUND ART

In general, a blackbox installed in a vehicle detects an impact applied to the vehicle and stores an image before or after the detection of the impact. In general, such an accident image is permanently preserved until the accident image is forcedly deleted by a user. A region in which the accident image is stored is a region in which the accident image is prohibited from being overwritten with a new image.

A cloud control system in which vehicles for business, such as trucks, buses, and taxes, are managed by a remote server is recently being introduced. In the cloud control system, a communication terminal installed in a vehicle transmits, to a control server, an image before or after the occurrence of an impact event immediately, periodically, or upon request from the server. Furthermore, the communication terminal installed in the vehicle transmits an accident image to a communication server, such as a police station, a fire station, or a road corporation, over a wideband communication network, which makes it possible to handle an urgent situation and contribute to reducing a loss of life in a big accident.

The blackbox stores an image whenever an impact greater than impact detection sensitivity occurs. A big accident in which a vehicle is greatly damaged or life damage occurs must be naturally recorded on the blackbox. However, a simple minor collision also needs to be recorded on the blackbox in order to reveal attributable reasons for the accident and in an economic aspect in which compensation for the loss needs to be considered. Accordingly, in most of blackboxes so far, impact detection sensitivity is set as a very low level.

Several tradeoffs occur because impact detection sensitivity of the blackbox is set as a low level. A storage medium (such as a NAND flash memory or an SD card) within the blackbox has a limited permanently preserved storage region because the storage medium has a limited capacity. Furthermore, in general, storage media have a problem in that lifespan thereof is reduced as a region on which a new image will be recorded is reduced because the storage media have limited lifespan for the number of pieces of writing. The greatest problem is that a lot of loss of time and economy is caused in identifying an image of a fake accident (not an actual accident), transmitting an image over a communication network, selecting, by a manager, an image, etc.

Accordingly, in order to reduce a loss consumed to select an accident image, a blackbox needs to autonomously filter out an image not corresponding to an accident, delete the image or storing the image in an overwritable region, and permanently preserve only an actual accident image or transmit the actual accident image to a control server.

In Korean Patent Application Publication No. 10-2013-0101821 entitled "BLACKBOX CHANGING SENSITIVITY OF SHOCK DETECTION ACCORDING TO VEHICLE SPEED, AND CONTROL METHOD THEREOF", an impact occurrence determination reference value is determined to be high based on a driving speed of a vehicle, and an image captured by a camera is permanently stored for a given time interval including timing at which an impact is determined to have occurred.

However, an actual vehicle accident frequently occurs even in low-speed driving. For example, an accident in which a vehicle that starts after stopping at a crossroad collides with a pedestrian who jaywalks or rear-ends a vehicle ahead frequently occurs. In this case, it is highly likely that the vehicle has traveled at a very low speed. In the Prior Document, such an accident may be erroneously determined to be not an impact because an impact occurrence determination reference value at a low speed is low. If an image of the accident is deleted without being stored in the blackbox, it may be difficult to reveal who is attributable to the accident. If the image of the accident is not transmitted to a cloud control server that manages a plurality of vehicles at a proper time, rapid and efficient management for the vehicles will fail. Such problems may instead increase a loss cost.

DISCLOSURE

Technical Problem

An object of the present disclosure is to provide a method of selecting an accident image using the results of the recognition of an obstacle on a road, which can distinguish between an actual accident image and a fake accident image by recognizing an obstacle on a road, such as a speed bump or a pothole, in an image captured by a camera of a vehicle, and determining an impact event to have a low accident possibility, the impact event occurring in a section in which the vehicle goes over the obstacle, or suppressing the impact event, can secure a space of a storage medium by deleting the fake accident image or prevent a data usage fee and unnecessary management expenses by blocking the transmission of the fake accident image to a remote cloud server, and can significantly reduce a loss cost consumed to select an accident image.

Technical Solution

A method of selecting an accident image using the results of the recognition of an obstacle on a road according to an embodiment of the present disclosure is a method of determining, by a blackbox or impact event generation apparatus installed in a vehicle, whether an image before or after impact detection timing is an actual accident image or a fake accident image. The method includes steps of (a) detecting an obstacle, which is located on a road ahead of the vehicle and whose impact is neglectable, from a photographed image photographed by a camera module of the vehicle, (b) determining a pass start time T1 when the vehicle starts to pass through the obstacle and a pass end time T2 when the vehicle completely goes over the obstacle, and (c) suppressing an impact event or determining the impact event to have a low accident possibility, the impact event being in a section between the pass start time T1 and the pass end time T2.

Advantageous Effects

According to the method of selecting an accident image based on speed profile analysis according to the present disclosure, there are effects in that an actual accident image and a fake accident image can be distinguished by recognizing an obstacle on a road, such as a speed bump or a pothole, in an image captured by a camera module, setting a section in which the vehicle goes over the obstacle by using information, such as a distance to the obstacle and a driving speed of the vehicle, and determining an impact event to have a low accident possibility, the impact event occurring in the section in which the vehicle goes over the obstacle, or suppressing the impact event, a space of a storage medium can be secured by deleting the fake accident image or a data usage fee and unnecessary management expenses can be prevented by blocking the transmission of the fake accident image to a remote cloud server, and a loss cost consumed to select an accident image can be significantly reduced.

BEST MODE

Figure 1:
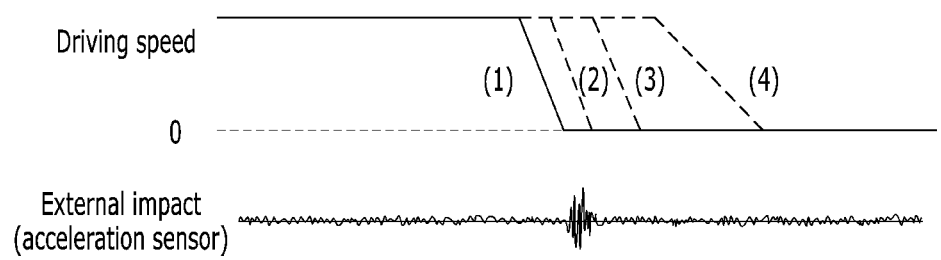
FIG. 1 is a speed change graph illustrating an example of a speed profile in which an impact event occurs in an actual accident situation.

Hereinafter, detailed embodiments according to the present disclosure are described with reference to the accompanying drawings. It is however to be understood that the present disclosure is not intended to be limited to the specific embodiments and includes all changes, equivalents and substitutions which fall within the spirit and technical scope of the present disclosure.

The same reference numeral is assigned to a portion having a similar element and operation throughout the specification. Furthermore, the accompanying drawings of the present disclosure are for convenience of description, and shapes and relative criteria thereof may be exaggerated or omitted.

In specifically describing the embodiments, a redundant description or a description of a technique evident in a corresponding field has been omitted. Furthermore, in the following description, when it is said that one element "includes" the other element, the word "include" means that the one element may further include an element other than the describe element unless explicitly described to the contrary.

Furthermore, a term, such as " . . . unit", " . . . er (or . . . or) ", or" . . . module" described in the specification, means a unit for processing at least one function or operation, and this may be implemented by hardware or software or a combination thereof. Furthermore, when it is described that one part is electrically connected to another part, it should be understood that the two parts may be directly connected to each other, or may be connected to each other with a third part interposed therebetween.

Terms, such as a "first" and a "second", may be used to describe various elements, but the elements are not limited by the terms. The terms are used to only distinguish one element from the other element. For example, a first element may be named a second element without departing from the scope of a right of the present disclosure. Likewise, a second element may be named a first element.

A method of selecting an accident image using the results of the recognition of an obstacle on a road according to the present disclosure is performed by a blackbox of a vehicle or another device serving as a blackbox. For example, the method of the present disclosure may be performed by an apparatus (referred to as an "impact event generation apparatus" in this specification) that is installed in a vehicle and serves to detect an impact event and store an impact detection image. The method of selecting an accident image using the results of the recognition of an obstacle on a road according to the present disclosure may be an algorithm or a processing routine executed by a blackbox or impact event generation apparatus of a vehicle. For example, the method of selecting an accident image using the results of the recognition of an obstacle on a road according to the present disclosure may be a computer-readable program stored in a read-only storage device (e.g., such as an ROM) within a blackbox, and may be a processing routine invoked and executed by a processor.

The method of selecting an accident image using the results of the recognition of an obstacle on a road according to the present disclosure relates to a method of previously recognizing an obstacle on a road while a vehicle travels and determining an impact event to have an accident possibility, the impact event occurring in a section in which the vehicle goes over the obstacle.

In the present disclosure, an impact detection image determined to have a high accident possibility may be permanently (until a user deletes the impact detection image or a storage medium is physically damaged) preserved in a storage medium. For another example, an impact detection image determined to have a high accident possibility may be stored in a region on which overwrite is prohibited or may be immediately moved to such a region. For another example, an impact detection image determined to have a high accident possibility may be immediately transmitted to a cloud control server in which a remote server manages vehicles for business, such as trucks, buses, and taxes.

In the present disclosure, an impact detection image determined to have a low accident possibility may not be stored in a storage medium. For another example, an impact detection image determined to have a low accident possibility may be stored in an overwritable region and may be preferentially overwritten when the storage capacity of a storage medium reaches its storage capacity limit. For still another example, an impact detection image determined to have a low accident possibility may not be transmitted to a cloud control server.

Meanwhile, in the present disclosure, while a vehicle travels, an obstacle on a road is recognized, and a time T1 to T2 during which the vehicle goes over the obstacle is determined. Furthermore, the occurrence of an impact event can be suppressed during the obstacle pass section T1 to T2. The occurrence of an impact event may be maintained until an obstacle pass start time T1, the occurrence of an impact event may be temporarily suppressed during the obstacle pass section T1 to T2, and the occurrence of an impact event may be restarted after an obstacle pass end time T2. The method of the present disclosure can fundamentally block the storage management of an unnecessary image by suppressing the occurrence of an impact event in the obstacle pass section T1 to T2.

In the present disclosure, an "obstacle" means an obstacle whose impact is neglectable. For example, in the present disclosure, in order to prevent the speeding of a vehicle, a speed bump that is a raised ridge across a road may be defined as an obstacle on a road. For another example, in the present disclosure, a round hole in a road, that is, a pothole, such as a manhole, a small sinkhole, a crack, or a puddle, may be defined as an obstacle on a road. However, in the present disclosure, an obstacle on a road is not limited to a speed bump and a pothole. For example, in the present disclosure, all things whose impact is detected by a vehicle, but neglectable, such a fallen object ahead having a low height, a small ridge, or other protrusions or potholes on or in a road, are defined as an obstacle.

Prior to a detailed description of embodiments of the present disclosure, the results of profiling speed changes in actual accident examples and fake accident examples upon occurrence of an impact event are described with reference to FIGS. 1 and 2.

FIG. 1 is a speed change graph illustrating an example of a speed profile in which an impact event occurs in an actual accident situation.

Referring to FIG. 1, a blackbox of a vehicle determines whether an impact event has occurred on the basis of an impact detection signal received through an impact detection sensor (e.g., an acceleration sensor) or a car area network (CAN) included the blackbox. The blackbox determines that an impact event has occurred in a section at the bottom of the graph of FIG. 1 in which amplitude of a signal is increased, and generates an impact detection signal.

If the impact event is an actual accident situation and a vehicle driver has recognized an accident possibility prior to the collision, it is highly likely that the vehicle will be suddenly decelerated prior to the impact event and will be completely stopped as in (1) illustrated as a solid line in the driving speed graph of FIG. 1. That is, the driving speed graph shown in (1) of FIG. 1 indicates an accident situation in which it is highly likely that the vehicle has actually collided against a moving object.

In (2) and (3) of FIG. 1, a sudden deceleration section is formed over timing at which the impact event occurred. This indicates a situation in which it is highly likely that a vehicle driver has checked a collision target late and pressed a brake pedal. For example, a speed profile shown in (2) and (3) of FIG. 1 is obtained in an accident in which a vehicle collided against a stationary object or collided against a moving object that suddenly appeared.

(4) of FIG. 1 illustrates sudden deceleration of the vehicle after the impact event occurred. This indicates a situation in which it is highly likely that a vehicle driver pressed a brake pedal after a collision without recognizing the collision against an object. For example, a speed profile shown in (4) of FIG. 1 is obtained in a situation in which a rear-end accident occurred due to a vehicle behind or a vehicle stopped for handling a collision accident in a situation in which a driver had not recognized the collision.

Common points in the speed profiles shown in (1) to (4) of FIG. 1 are that the driving speed of the vehicle has dropped to zero close to a stop at close timing before and after the occurrence of the impact event and the driving speed has suddenly decelerated. Furthermore, the situations illustrated in FIG. 1 all correspond to a situation in which an actual accident has occurred.

Figure 2:
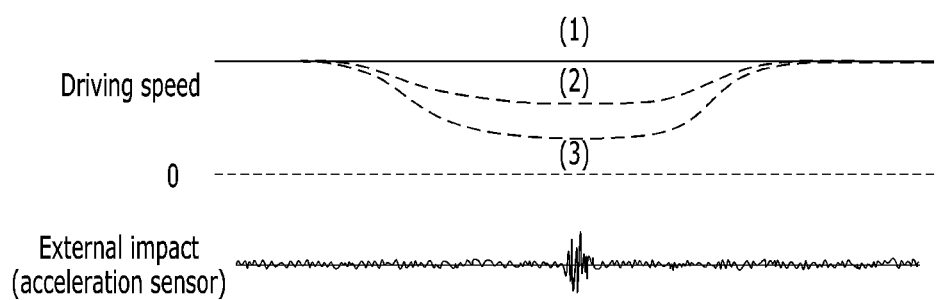
FIG. 2 is a speed change graph illustrating speed profile examples in which an impact event attributable to an obstacle impact, not an accident, occurs.

FIG. 2 is a speed change graph illustrating speed profile examples in which an impact event attributable to an obstacle impact, not an accident, occurs, and illustrates a speed change when a vehicle is impacted by an obstacle (such as a speed bump or a pothole) on a road.

As described in Background Art, a blackbox generates an impact event even with respect to a small impact occurring when a vehicle goes over an obstacle on a road. For example, a driver may not recognize a speed bump and pass through the speed bump without deceleration as in (1) of FIG. 2. (2) of FIG. 2 corresponds to a speed profile of a situation in which a driver recognized an obstacle, but expects that an impact will not be great, slightly reduces the speed and goes over a speed bump. (3) of FIG. 2 corresponds to a speed profile of a situation in which a driver goes over a high speed bump installed in a school zone, and corresponds to a speed profile of a case where the driver goes over an obstacle at a low speed.

It may be seen that the situations (1) to (3) of FIG. 2 are situations in which deceleration is present before and after the impact event, but sufficient deceleration to stop the vehicle is not present. When the examples of (1) to (3) of FIG. 2 are synthesized, it may be seen that although an impact event occurs when a vehicle goes over a speed bump or a pothole, a situation in which an actual accident does not occur frequently occurs.

Figure 3:
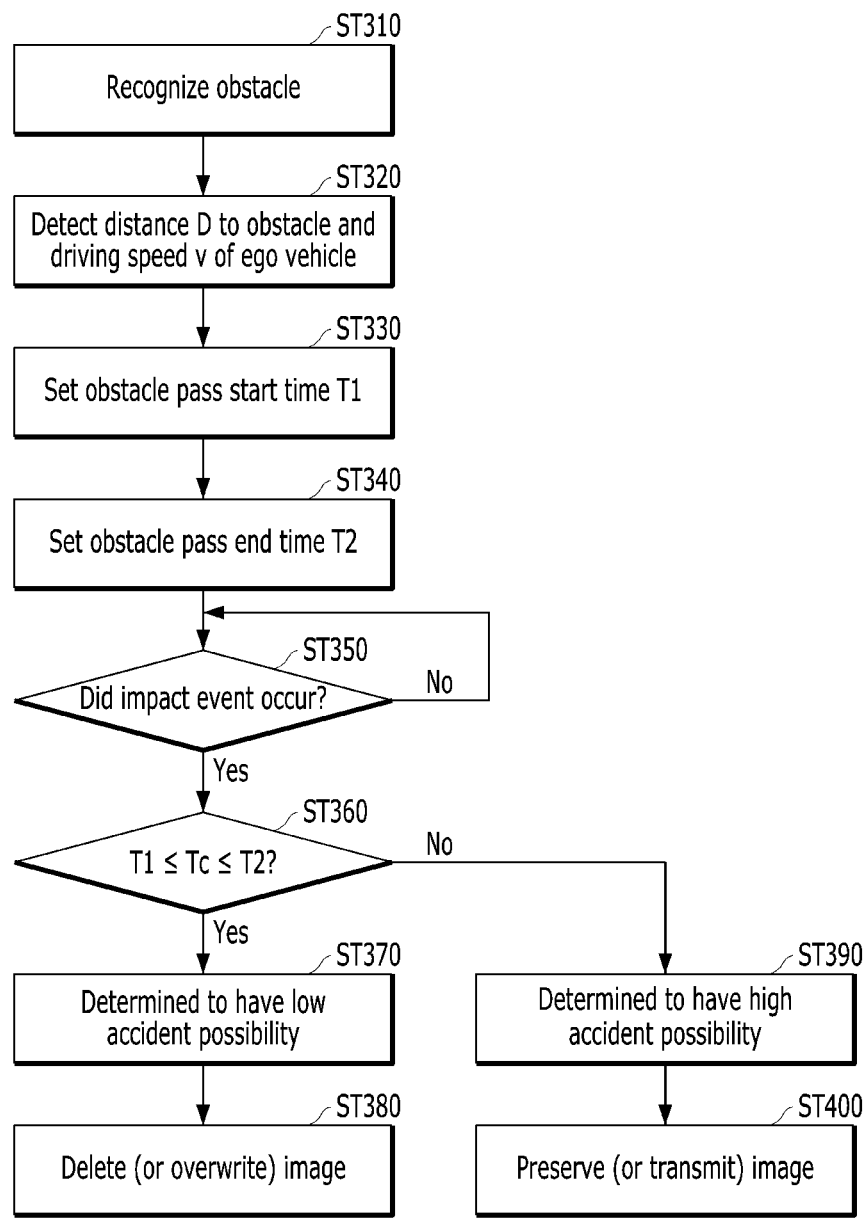
FIG. 3 is a flowchart illustrating a method of selecting an accident image using the results of the recognition of an obstacle on a road according to the present disclosure.

FIG. 3 is a flowchart illustrating a method of selecting an accident image using the results of the recognition of an obstacle on a road according to the present disclosure.

Referring to FIG. 3, the method of selecting an accident image using the results of the recognition of an obstacle on a road according to the present disclosure starts with a step of recognizing as an obstacle, which is located on a road ahead of a vehicle and whose impact is neglectable, from a photographed image photographed by a camera module of the vehicle (ST310).

A method of recognizing an obstacle may be implemented in various ways. For example, objects may be recognized in a photographed image. An obstacle may be recognized based on image recognition for determining whether the recognized object is similar to a previously stored speed bump object or pothole object. For another example, an obstacle may be recognized in a photographed image through machine learning, deep learning, or other artificial intelligence learning. A process of recognizing an obstacle in the present disclosure is described as follows with reference to FIG. 4.

Figure 4:
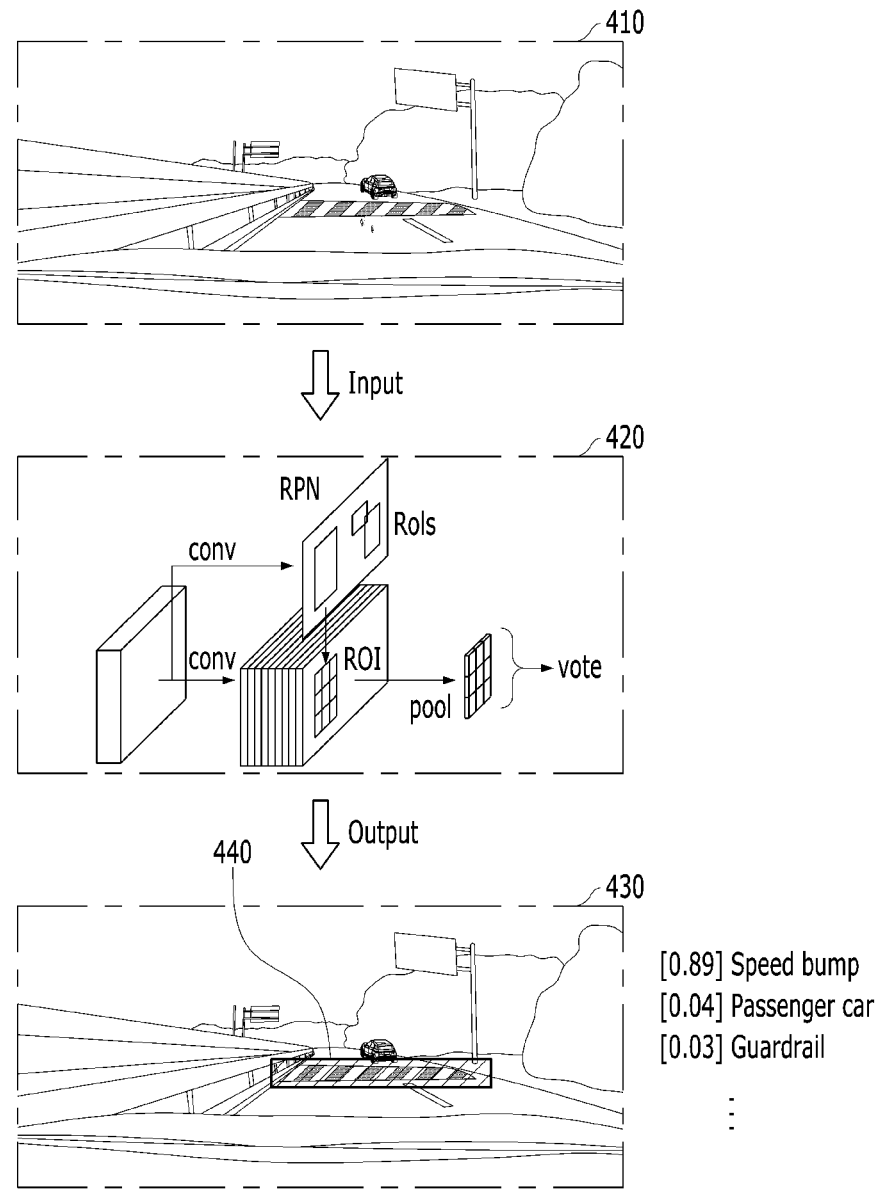
FIG. 4 is a diagram schematically depicting a process of recognizing an obstacle through CNN-based machine learning in the present disclosure.

FIG. 4 is a diagram schematically depicting a process of recognizing an obstacle through CNN-based machine learning in the present disclosure.

Referring to FIG. 4, a photographed image 410 photographed by a camera module of a vehicle may be used as an input to a neural network learning unit 420. The neural network learning unit 420 may detect objects through machine learning. The neural network learning unit 420 may consist of a plurality of convolution layers. Furthermore, the neural network learning unit 420 may consist of convolution neural networks (CNNs), that is, a set of convolution layers and fully connected layers.

The set of neural networks constituting the neural network learning unit 420 operates region of interests (RoIs) through a region proposal network (RPN) without selective search, and detects objects by pooling the operated RoIs. The detected objects are classified as majority votes. A specific class layer is calculated based on the type of object.

As in the lower side of FIG. 4, a speed bump 440 may be recognized based on results outputted by the neural network learning unit 420. The neural network learning unit 420 does not suggest only one result with respect to a class layer of a detected object, and displays a degree that the result coincides with each pre-set class layer. As conceptually illustrated in FIG. 4, the neural network learning unit 420 may output a bounding box for identifying the speed bump 440 in an object detection image 430 in a coincidence ratio of 89% with a predefined class layer of the speed bump.

The neural network learning unit 420 may recognize, as the speed bump 440, a bounding box having a dominantly high coincidence ratio of 89% with the predefined class layer.

Referring back to FIG. 3, in a next step, a distance D to the obstacle and a driving speed v of an ego vehicle are detected (ST320).

The distance D to the obstacle may be operated based on the image photographed by the camera module.

Figure 5:
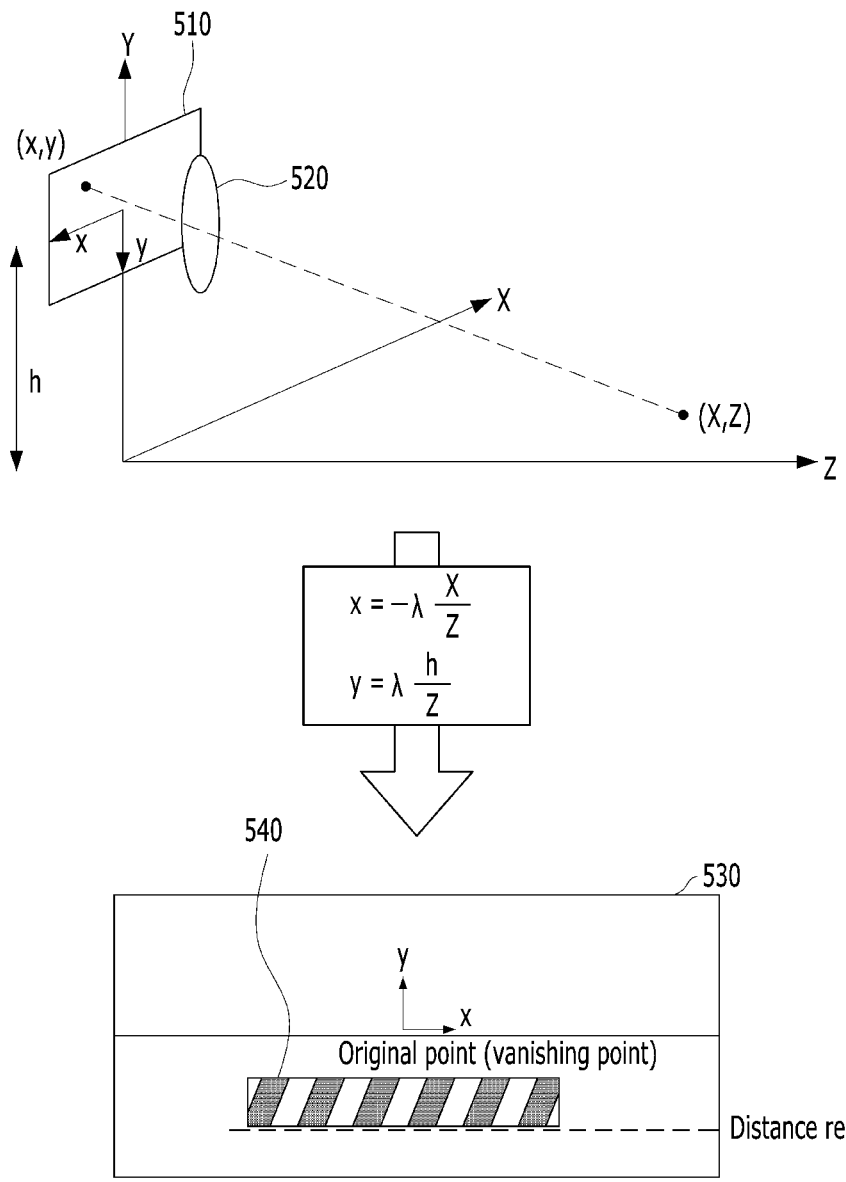
FIG. 5 is a diagram schematically depicting a process of recognizing a distance to an obstacle based on image recognition in the present disclosure.

Alternatively, the distance D from the vehicle to the obstacle may be obtained by learning the image through machine learning or deep learning. As illustrated in FIG. 5, the distance D to the obstacle may be operated based on an image recognition technology.

The driving speed v may be obtained by receiving a signal from an in-vehicle speedometer. For example, vehicle speed information may be obtained in a cycle of 20 ms to 100 ms depending on a communication environment within vehicle. Furthermore, the driving speed v may be operated from a global positioning system (GPS) module. A common GPS module updates speed information every second. Furthermore, the driving speed v may be obtained based on image recognition. For example, the driving speed v may be operated by obtaining a difference AD between the distances to an obstacle from images at two different timings at which the obstacle is recognized and dividing the distance difference AD by a time difference At between the two timings.

FIG. 5 is a diagram schematically depicting a process of recognizing a distance to an obstacle based on image recognition in the present disclosure. The process of operating the distance D to the obstacle in step ST320 is described with reference to FIG. 5.

A correlation between an actual coordinate system and a camera viewport coordinate system is illustrated at the upper side of FIG. 5. As illustrated, actual coordinate points (X, Z) on a road may be refracted by a lens 520, and may be projected and displayed as image recognition coordinate points (x, y) on a camera viewport 510 detected by a sensor of a camera module.

If actual coordinates at any one feature point of an object photographed by a camera module are (X, Z), (Equation 1) and (Equation 2) below are established between the actual coordinates (X, Z) and image recognition coordinate points (x, y) onto which the feature point of the corresponding object has been projected on the camera viewport 510:

$$x = -\lambda \frac{X}{Z} \quad \text{(Equation 1)}$$

$$y = \lambda \frac{h}{Z} \quad \text{(Equation 2)}$$

wherein x is a horizontal distance between an original point (or a vanishing point) and a feature point of the object on the viewport photographed by the camera module, y is a vertical distance between the original point and the feature point of the object on the viewport photographed by the camera module, λ is a focal distance of the camera module, h is height of the camera module from the ground, X is an actual transverse distance between the camera module and the object, and Z is an actual longitudinal distance between the camera module and the object.

(Equation 3) below may be derived from (Equation 2).

$$Z = \lambda \frac{h}{y} \quad \text{(Equation 3)}$$

In an image recognition screen 530 illustrated at the lower side of FIG. 5, it is assumed that a speed bump 540, that is, an obstacle in front of a vehicle, was recognized. In order to operate a distance between the vehicle and a start point of the speed bump 540, a contour line at the bottom of the speed bump 540 becomes a distance reference line. Since the focal distance λ of the camera module and the height h of the camera module from the ground are known information, an actual distance Z between the camera module and the start point of the speed bump 540 may be obtained by measuring the vertical height y between the distance reference line depicted as a dotted line in FIG. 5 and the original point on the camera viewport. Furthermore, the distance D from the vehicle to the obstacle may be obtained by subtracting, from the actual distance Z, a longitudinal distance Dc from the front end of the vehicle to the camera module.

That is, the distance D to the obstacle may be calculated by using (Equation 4) below using (Equation 3):

$$D = \lambda \frac{h}{y} - Dc \quad \text{(Equation 4)}$$

wherein λ is the focal distance of the camera module, h is the height of the camera module from the ground, y is the vertical distance between the original point on the viewport photographed by the camera module and the bottom of the contour line of the obstacle, and Dc is a longitudinal distance from the front end of the vehicle to the camera module.

Referring back to FIG. 3, in the method of selecting an accident image according to the present disclosure, an obstacle pass start time T1 and an obstacle pass end time T2 are set using the distance D to the obstacle and the driving speed v of the vehicle (ST330 and ST340). That is, in this case, a section T1 to T2 at timing at which the vehicle goes over the obstacle, such as a speed bump or a pothole, is determined.

In the present disclosure, an impact event is suppressed or the impact event is determined to have a low accident possibility in the section T1 to T2 in which a vehicle goes over an obstacle. To the contrary, in the present disclosure, an impact event is maintained or the impact event is determined to have a high accident possibility at timing at which a vehicle does not pass through an obstacle.

In the method of selecting an accident image according to the present disclosure, whether an impact event has occurred is determined in step ST350 (ST350).

Furthermore, when the impact event occurs, whether impact event occurrence timing Tc is located between the pass start time T1 and the pass end time T2 is determined (ST360).

When the determination result of step ST360 is "Yes", the corresponding impact event is determined to have a low accident possibility (ST370), and an image at the impact event occurrence timing Tc is not stored in a storage medium of a blackbox (ST380). Alternatively, in step ST380, the image at the impact event occurrence timing Tc is stored in an overwritable region of the storage medium or moved to such a region. Alternatively, in step ST380, the corresponding image is not transmitted to a remote control server.

When the determination result of step ST360 is "No", the corresponding impact event is determined to have a high accident possibility (ST390). The image at the impact event occurrence timing Tc is permanently preserved in the storage medium of the blackbox (ST400). Alternatively, in step ST400, the image at the impact event occurrence timing Tc is stored in an overwrite prohibition region of the storage medium or moved to such a region. Alternatively, in step ST400, the corresponding image is immediately transmitted to the remote control server.

Figure 6:
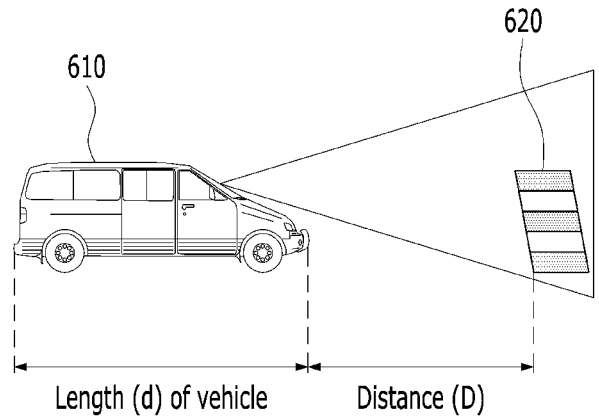
FIG. 6 is a diagram schematically depicting a process of setting an obstacle pass start time T1 and an obstacle pass end time T2 in the present disclosure.
Figure 6:
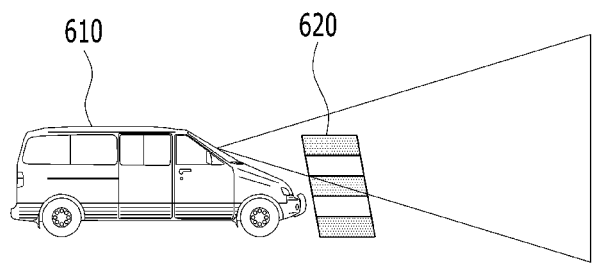
Figure 6:
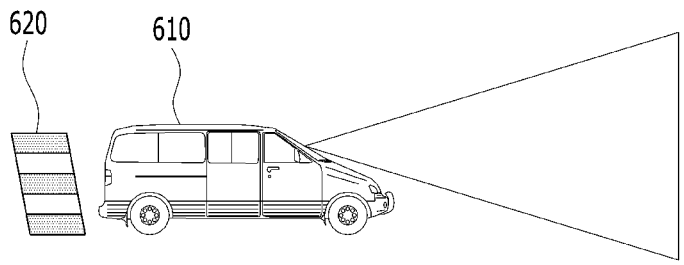

FIG. 6 is a diagram schematically depicting a process of setting an obstacle pass start time T1 and an obstacle pass end time T2 in the present disclosure.

(a) of FIG. 6 illustrates the state in which a vehicle 610 is located at a point distant by a distance D from a speed bump 620 in its progress direction. Since the distance D to an obstacle and the driving speed v of the vehicle may be obtained as described above, the time when the vehicle 610 arrives ahead of the obstacle as in (b) of FIG. 6, that is, the obstacle pass start time T1, may be operated. Furthermore, the time right after the vehicle 610 goes over the obstacle as in (c) of FIG. 6, that is, the obstacle pass end time T2, may be operated. In this case, it is preferred to set a start time margin ($\Delta T_{start}$) and a pass time margin ($\Delta T_{end}$) by considering the length of the vehicle, speed measurement, a camera location, a distance measurement error attributable to vibration, etc.

The pass start time T1 may be operated using (Equation 5) below, and the pass end time T2 may be operated using (Equation 6) below:

$$T1 = \frac{D}{v} - \Delta T_{start} \quad \text{(Equation 5)}$$

$$T2 = \frac{(D+d)}{v} + \Delta T_{end} \quad \text{(Equation 6)}$$

wherein d is the length of the vehicle, $\Delta T_{start}$ is the margin for applying an offset to the obstacle pass start time, and $\Delta T_{end}$ is a margin for applying an offset to the obstacle pass end time.

Figure 7:
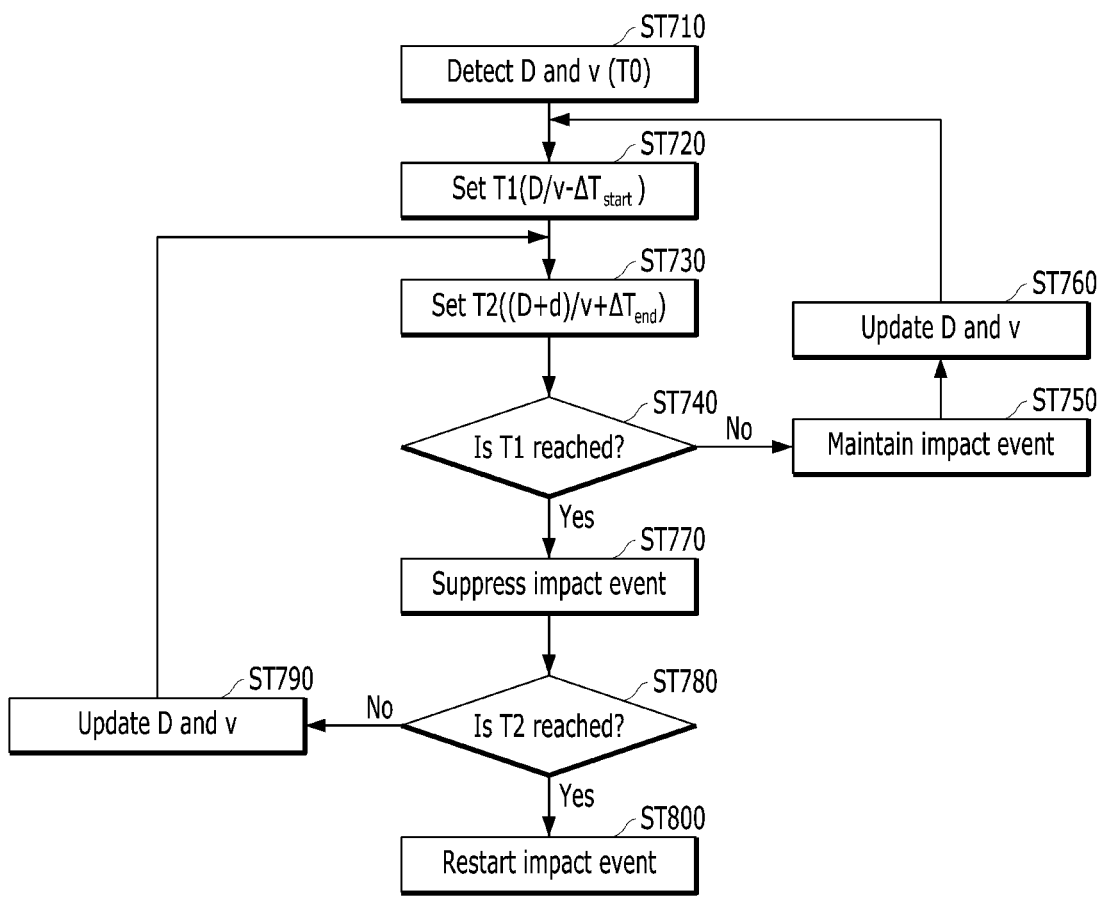
FIG. 7 is a flowchart illustrating a process of updating the obstacle pass start time T1 and the obstacle pass end time T2 in the present disclosure.

Meanwhile, the driving speed v of the vehicle is a factor that greatly varies depending on a measured time. The distance D to the obstacle is also a factor that momentarily varies depending on the driving speed V. Furthermore, the obstacle pass start time T1 and obstacle pass end time T2 also need to be updated when the distance D to the obstacle and the driving speed v are changed. FIG. 7 illustrates such an update process and an impact event processing process according to time updates.

FIG. 7 is a flowchart illustrating a process of updating the obstacle pass start time T1 and the obstacle pass end time T2 in the present disclosure.

Referring to FIG. 7, the distance D to an obstacle and the driving speed v are detected at timing TO (ST710). Next, the obstacle pass start time T1 is set using (Equation 5) above (ST720). Furthermore, the obstacle pass end time T2 is set using (Equation 6) above (ST730).

Next, whether the obstacle pass start time T1 is reached is determined (ST740). When the determination result of step ST740 is "No", an impact event is maintained (ST750), and the distance D to the obstacle and the driving speed v are updated (ST760). After step ST760, the process returns to step ST520, and the obstacle pass start time T1 and the obstacle pass end time T2 are updated. When the determination result of step ST740 is "Yes", the impact event is suppressed (ST770).

Next, whether the obstacle pass end time T2 is reached is determined (ST780). When the determination result of step ST780 is "No", the distance D to the obstacle and the driving speed v are updated while the impact event suppressed state is maintained (ST790). After step ST790, the process returns to step ST530, and the obstacle pass end time T2 is updated. When the determination result of step ST780 is "Yes", the impact event is restarted (ST800).

The disclosed disclosure may be modified in various ways within a range that does not impair a basic spirit of the present disclosure. That is, all the embodiments should be interpreted as being illustrative and are not interpreted as being limitative. Accordingly, the scope of protection of the present disclosure should be determined by the accompanying claims, not the above embodiments. If a limited element in the accompanying claims is substituted with an equivalent thereto, the substitution should be construed as belonging to the scope of the protection of the present disclosure.

The invention claimed is:

1. A method of determining an accident image using recognition results of an obstacle on a road, by a blackbox or impact event generation apparatus installed in a vehicle, whether an image before or after impact detection timing is an actual accident image or a fake accident image, by using results of recognition of an obstacle on a road, the method comprising steps of:

(a) obtaining, by a camera module of the vehicle, a photographed image of a road ahead of the vehicle, and detecting, by a processor provided in a blackbox or an impact event generation apparatus, an obstacle, which is located on the road ahead of the vehicle and whose impact is neglectable, from the photographed image;

(b) determining, by the processor, a pass start time (T1) when the vehicle starts to pass through the obstacle and a pass end time (T2) when the vehicle completely goes over the obstacle;

(c-1) detecting, by the processor, an occurrence of the impact event from an impact detection signal obtained by an impact detection sensor or a car area network (CAN) included the blackbox;

(c-2) determining, by the processor, whether an impact event occurrence timing (Tc) is located between the pass start time (T1) and the pass end time (T2) when the impact event occurs;

(c-3) determining, by the processor, the impact event to have a low accident possibility when the impact event occurrence timing (Tc) is located between the pass start time (T1) and the pass end time (T2); and (c-4) determining, by the processor, the impact event to have a high accident possibility when the impact event occurrence timing (Tc) is located before the pass start time (T1) or after the pass end time (T2).

2. The method of claim 1, wherein when the impact event has the low accident possibility, the processor does not store an image at the impact event occurrence timing (Tc) in a storage medium of the blackbox or the impact event generation apparatus or not transmit to a remote control server.

3. The method of claim 1, wherein when the impact event has the high accident possibility, the processor stores an image at the impact event occurrence timing (Tc) in an overwrite prohibition region of a storage medium of the blackbox or the impact event generation apparatus or immediately transmits to a remote control server.

4. The method of claim 1, wherein the obstacle is a speed bump or a pothole.

5. The method of claim 4, wherein the step (a) comprises steps of:
operating, by a neural network learning unit comprising a plurality of convolution layers, at least one region of interest (RoI) through a region proposal network (RPN),
detecting an object by pooling the RoI,
calculating a class layer of the detected object, and
then recognizing, as an obstacle, an object having a high coincidence ratio with a class layer of the speed bump or the pothole.

6. The method of claim 1, further comprising a step of detecting, by the processor, a distance (D) from the vehicle to the obstacle and a driving speed (v) of the vehicle after the step (a).

7. The method of claim 6, wherein the distance (D) to the obstacle is obtained using following equation:

$$D = \lambda \frac{h}{y} - D_c,$$

wherein $\lambda$ is a focal distance of the camera module, h is a height of the camera module from the ground, y is a vertical distance between an original point on a viewport photographed by the camera module and a bottom of a contour line of the obstacle, and Dc is a longitudinal distance from a front end of the vehicle to the camera module.

8. The method of claim 6, wherein the driving speed (v) is detected based on a value obtained by dividing a difference between the distances (D) to the obstacle at two different timings, at which the obstacle is recognized, by a time difference between the two timings.

9. The method of claim 6, wherein in the step (b), the pass start time (T1) and the pass end time (T2) are obtained using following equations, respectively:

$$T1 = \frac{D}{y} - \Delta T_{start}$$

$$T2 = \frac{(D+d)}{y} + \Delta T_{end},$$

wherein d is a length of the vehicle, $\Delta T_{start}$ is a margin for applying an offset to the obstacle pass start time, and $\Delta T_{end}$ is a margin for applying an offset to the obstacle pass end time.

10. The method of claim 9, wherein the step (b) comprises steps of:
(b-1) setting the pass start time (T1) and the pass end time (T2);
(b-2) updating the pass start time (T1) by maintaining the impact event and detecting the distance (D) to the obstacle and the driving speed (v) again before the pass start time (T1) is reached;
(b-3) suppressing the impact event after the pass start time (T1) is reached;
(b-4) updating the pass end time (T2) by maintaining the suppression of the impact event and detecting the distance (D) to the obstacle and the driving speed (v) again before the pass end time (T2) is reached; and
(b-5) restarting the impact event after the pass end time (T2) is reached.

* * * * *